(12) United States Patent
Cohen et al.

(10) Patent No.: US 8,531,974 B2
(45) Date of Patent: Sep. 10, 2013

(54) TECHNIQUE FOR TESTING PEERS IN MULTICAST NETWORK DOMAIN

(75) Inventors: Amit Cohen, Nes Ziona (IL); Dan Ben-Chaim, Yehud (IL); Alberto Schliserman, Modin (IL)

(73) Assignee: ECI Telecom Ltd., Petach-Tikva (IL)

( * ) Notice: Subject to any disclaimer, the term of this patent is extended or adjusted under 35 U.S.C. 154(b) by 511 days.

(21) Appl. No.: 12/674,791

(22) PCT Filed: Aug. 21, 2008

(86) PCT No.: PCT/IL2008/001108
§ 371 (c)(1),
(2), (4) Date: Feb. 23, 2010

(87) PCT Pub. No.: WO2009/024965
PCT Pub. Date: Feb. 26, 2009

(65) Prior Publication Data
US 2011/0051597 A1    Mar. 3, 2011

(51) Int. Cl.
*G06F 11/00*    (2006.01)
(52) U.S. Cl.
USPC .......................................... 370/242; 370/390
(58) Field of Classification Search
USPC .............. 370/216, 241, 241.1, 242, 252, 254, 370/389, 390, 400, 401, 338
See application file for complete search history.

(56) References Cited

U.S. PATENT DOCUMENTS

| 7,184,421 | B1* | 2/2007 | Liu et al. .................... 370/338 |
| 2005/0099951 | A1 | 5/2005 | Mohan et al. |
| 2006/0159008 | A1* | 7/2006 | Sridhar et al. .............. 370/216 |
| 2007/0025256 | A1 | 2/2007 | Hertoghs et al. |

FOREIGN PATENT DOCUMENTS

WO    2006076493 A2    7/2006

OTHER PUBLICATIONS

Virtual Bridged Local Area Networks-Amendment 5: Connectivity Fault Management, Draft Standard for Local and Metropolitan Area Networks, Aug. 22, 2006, P.802.1ag/D7.

* cited by examiner

*Primary Examiner* — Donald Mills
*Assistant Examiner* — Mon Cheri Davenport
(74) *Attorney, Agent, or Firm* — Browdy and Neimark, PLLC

(57) ABSTRACT

A technique for testing peer nodes in a multicast domain (such as an access network) interconnected with an Ethernet network via an Intermediate Bridge (IB), especially helpful when an individual MAC address of a destination peer node is unknown. The technique comprises a) issuing a Connectivity Fault Management (CFM) message from the Ethernet network, and introducing into the CFM message alternative destination data being different than the individual MAC address of the destination peer node; b) utilizing the alternative destination data, at the IB, for determining topological position or address of the destination peer node, and c) forwarding contents of the CFM message only to the destination peer node.

11 Claims, 6 Drawing Sheets

FORMAT FOR PORT ID TLV

| | 0 | 1 | 2 | 3 |
|---|---|---|---|---|
| 1 | TYPE=1 | LENGTH | | CHASSIS ID LENGTH FIELD |
| 5 | CHASSIS ID SUBTYPE FIELD | CHASSIS ID FIELD... | | |
| (6-CHASSIS ID LENGTH FIELD) | PORT ID LENGTH FIELD | PORT ID SUBTYPE FIELD | PORT ID FIELD... | |
| (8-CHASSIS ID LENGTH FIELD + PORT ID LENGTH FIELD) | MANAGEMENT ADDRESS LENGTH FIELD | MANAGEMENT ADDRESS FIELD... | | |

FORMAT FOR PORT ID TLV

| | 0 | 1 | 2 | 3 |
|---|---|---|---|---|
| 1 | TYPE=1 | LENGTH | | CHASSIS ID LENGTH FIELD |
| 5 | CHASSIS ID SUBTYPE FIELD | CHASSIS ID FIELD... | | |
| (6−CHASSIS ID LENGTH FIELD) | PORT ID LENGTH FIELD | PORT ID SUBTYPE FIELD | PORT ID FIELD... | |
| (8−CHASSIS ID LENGTH FIELD + PORT ID LENGTH FIELD) | MANAGEMENT ADDRESS LENGTH FIELD | MANAGEMENT ADDRESS FIELD... | | |

FIG.5A

FORMAT OF IB PORT TLV

| | 0 | 1 | 2 | 3 |
|---|---|---|---|---|
| 1 | TYPE=TBD | | LENGTH | IB PORT CHASSIS ID LENGTH FIELD |
| 5 | IB PORT CHASSIS ID SUBTYPE FIELD | IB PORT CHASSIS ID FIELD | | |
| 6+IB PORT CHASSIS ID LENGTH FIELD | IB PORT ID LENGH FIELD | IB PORT ID SUBTYPE FIELD | IB PORT ID FIELD | |
| 8+IB PORT CHASSIS ID LENGTH FIELD + IB PORT ID LENGTH FIELD | IB MANAGEMENT ADDRESS LENGTH FIELD | IB MANAGEMENT ADDRESS FIELD | | |

FIG.5B

TECHNIQUE FOR TESTING PEERS IN MULTICAST NETWORK DOMAIN

FIELD OF THE INVENTION

The present invention relates to methods for testing peers in a multicast network domain such as an access network, interconnected with an Ethernet communication network. More specifically, the invention relates to a method of testing connectivity/status/performance of a peer when its individual MAC address of the peer is unknown.

BACKGROUND OF THE INVENTION

Connectivity Fault Management (CFM) is known to those skilled in the art of telecommunications as a system of signaling messages, comprising standardized methods for testing connectivity among Ethernet ports (or peers). An existing CFM standard IEEE P802.1.ag is based on the assumption that Maintenance Points (MP) can discover their peers by using Continuity Check Messages (CCM) being a type of CFM messages. Another method, used when a destination MAC address of the peer is unknown, is sending multicast CFM messages; such a message is forwarded to all MPs in the domain of the sender and then to all their peers. The CFM messages have a format of Ethernet frames, but a different EtherType.

More specifically, the Standard Draft for Local and Metropolitan Area Networks IEEE P802.1ag/D7 (Virtual Bridged Local Area Networks, Amendment 5: Connectivity Fault Management) describes several methods of Connectivity Fault Management (CFM), that can be used to test connectivity among Ethernet Peers. Ethernet Peers should be understood as Ethernet entities that belong to the same "Shared Medium" e.g., to the same Maintenance Domain for untagged traffic or to the same VLAN and Maintenance Domain for tagged traffic. (VLAN Tag according to IEEE 802.1Q is meant).

CFM uses some a priori configurations to check the Ethernet peers that belong to a shared media. In some cases CFM allows CCM messages to discover peer neighbors, but in such cases CCM cannot be used to identify alien peers. In other cases CFM can operate without configuration of peer MAC addresses and without using CCM messages, say by sending its other message types (Loop Back Messages, Link Trace or Test Messages) to multicast Ethernet addresses. In these cases all receivers of the messages will respond to the sender (being an MP in a Maintenance domain and VLAN). It means that if, in the domain, the link is 1:1 point-to-point link there will be only one response; but if there are many links/peers in the domain as in the cases of 1:N Tree or N:N LAN, many responses will be received at the MP.

The standardized way of operation imposed by CFM creates serious operational problems in network architectures where at least one of the following difficulties takes place:
Some or all MAC addresses cannot be pre-configured;
Users may change MAC addresses without reporting to a network operator; e.g. a user may replace some User Devices (e.g. CPEs, Mobile modems). As a result, the Network operator cannot track MAC addresses of User Devices since they are often replaced;
MAC addresses cannot be approved for uniqueness, for example two User devices may have the same MAC address rendering CFM unusable.
Part of the network does not support CFM.

The situations described above are frequently encountered in small networks in which Ethernet is set up automatically without any planned configuration process. They also take place in access networks where modules of Customer Premises Equipment (CPE) belong to users and thus may unilaterally be replaced by them. Networks with nomadic/roaming or mobile Ethernet users are also problematic, since MAC addresses in such networks are continuously updated and hard to track.

A number of approaches were proposed in the prior art, trying to solve the above problems of using CFM messages in access networks.

WO06076493A2 to Alcatel describes a system and a method for monitoring end nodes in an access network, using Ethernet Connectivity Fault Management (CFM). A broadband access server (BRAS) is operable to generate an Ethernet CFM frame that includes a query message with respect to a particular end node. An interworking function (IWF) entity associated with an access node that services the particular end node is operable to interpret the Ethernet CFM frame and construct a corresponding query message in a native protocol compatible with the particular end node. Upon receiving a reply message from the particular end node, the IWF entity constructs a suitable reply Ethernet CFM frame for transmission to the BRAS, wherein the reply Ethernet CFM frame includes a response corresponding to the reply message from the end node.

The interworking function (IWF) in the Access Node will thus divide the maintenance domain into two sub-domains: from IWF to BRAS (which is a CFM compliant sub-domain) and from IWF to a Resident's Gateway RG (CPE) which may be a non-CFM compliant or even non-Ethernet one. In the direction from BRAS to RGs, the IWF will be responsible to translate MAC addresses known to BRAS to "native" messages designated to specific RGs. In the direction from RGs to BRAS the IWF will be responsible for translating the addresses of the RGs to addresses known by BRAS. In this method the IWF "hides" the problem of addressing CFM in access networks. MAC addresses of the end nodes are unknown and remain unknown to BRAS since the CFM messages are always translated in both directions by the IWF.

If BRAS needs to send a CFM message that is planned to reach also unknown MAC addresses, the BRAS will have to multicast a corresponding message to a number of RGs.

Besides that, the fact the Interworking Function in the BRAS performs full processing of CFM messages in both directions, by changing their contents and format, adds to the complexity of the described method.

US2007025256AA to Cisco describes a broadband access node including a port for connection with a Digital Subscriber Line and a processor to run code that implements a so-called virtual maintenance end point (vMEP). The vMEP translates an IEEE 802.1ag Loopback Message (LBM) received from a device on an Ethernet access network into a legacy Operations And Maintenance (OAM) message that is transmitted to a residential gateway (RG) device. The legacy OAM message determines a link-level connectivity status between broadband access node and the RG device. The vMEP also transmits a reply message back to the device on an Ethernet access network in compliance with the IEEE 802.1ag specification. The US2007025256AA introduces a new entity in the Access Node, called "virtual Maintenance End Point". The virtual maintenance end points reflect the actual maintenance status of a real maintenance point that cannot be reached for various reasons (e.g. missing MAC address, or a different access technology such as ATM, that does not support CFM messages). If BRAS (broadband remote access server) needs to send a CFM message that is supposed to reach unknown MAC addresses, BRAS will have to multicast a corresponding message to a number of RGs.

OBJECT AND SUMMARY OF THE INVENTION

There is a long felt need in a technology where a CFM message, intended for a remote node, could be addressed to it even without knowing its MAC address and without excessive multicasting, and could be handled in any type of multicast domains. It is desired that the method be suitable both to multicast domains supporting CFM, and to those not supporting CFM.

The proposed idea is to test connectivity of a destination peer node in a multicast domain (such as an access network), which is interconnected with an Ethernet-type network via an Intermediate Bridge IB, by using the following steps:

sending a Connectivity Fault Management (CFM) message from the Ethernet-type network (towards the multicast domain), introducing, in one or more predetermined fields of the CFM message, alternative destination data indicative of a topological position of the destination peer node and being other than (alternative to) its individual MAC address;

utilizing said alternative destination data, at the IB, for determining the topological position or address of said destination peer node, and forwarding contents of said CFM message to said destination peer node.

In a preferred version of the proposed method, the CFM message comprises and utilizes, in a proprietary manner, one or more predetermined fields such as TLVs (more particularly, proprietary TLVs) which would serve as a communication channel between a sender of the CFM message in the Ethernet-type network and the intermediate bridge IB distributing the CFM messages to the multicast domain. However, possible use of other fields in the CFM message is not wiped away.

The TLV (Type Length Value) is a mechanism that allows definition of parameters that have been a priory correlated between sender and receiver.

In our proposal, at least one proprietary TLV in a CFM message may indicate the destination of the CFM message in an alternative manner, without indicating its specific MAC address.

Since the sender of a CFM message knows "who" is the addressee (destination), but may not know its exact MAC address, the sender's equipment is adapted to introduce in the CFM message some alternative information indicative of the topological position of the end node. The information would indicate, in an alternative manner (without a specific MAC address), to what entity the message is destined and should be sufficient for determining, at the IB, a physical or a logical port with which the individual intended destination of the message is associated.

That information (being the alternative destination data) is usually a specific identifier of the destination. It may directly show a port number in the Intermediate Bridge IB, to which the destination peer is connected. In another example, that information may comprise the subscriber's ID, the subscriber's name, a service ID, etc., and should be further associated with a specific IB port number (possibly with the aid of an IB internal data base).

What happens at IB when it receives a CFM message? Usually, unicast CFM messages comprise indication of the destination individual MAC address. The problem usually appears when a multicast CFM message arrives (indicating a multicast MAC). In the prior art, such a message was always forwarded to all the IB peers. If, according to the invention, the multicast CFM message comprises an alternative destination data, the IB is capable of preventing unnecessary multicasting to its peers.

According to the proposed method, if IB gets a CFM message with a multicast MAC, it will check whether a proprietary TLV is present in the CFM packet, whether it comprises alternative destination data, and will analyze the data.

Based on the analysis, the IB will determine a single destination peer, and create a single message for forwarding the contents of the CFM message to that single destination peer. The single message will be sent in a format appropriate for the determined destination peer. The format of the signaling message can be CFM or any other OAM Message format understood by the destination peer or entity.

If the destination entity is CFM capable, as may be the case in Ethernet based access networks such as Pure Ethernet, Ethernet carrying other types of traffic or Ethernet PseudoWire, the Intermediate Bridge just forwards the CFM message to the single specific destination entity, the destination entity will receive the single message in the CFM format and then may send a CFM response to the CFM message source address. This source address has become immediately known to the destination entity, since it was included in the OAM (CFM) message. In such a case, since the response message is a standard CFM OAM message, upon arriving at the IB, it will be forwarded to the sender "as is", as any other Ethernet frame.

If the destination entity is not CFM capable, say it belongs to a non-Ethernet access network, it must receive the downstream signaling message in its native OAM format (protocol) and will respond in the native OAM protocol. The intermediate bridge IB will convert the received response (i.e., an upstream signaling message in the native OAM protocol) to the CFM format and forward the response to the CFM message source.

As can be seen, the proposed method allows testing peers in any multicast domain by utilizing single CFM messages even in cases when MAC addresses of the peers are not known.

In CFM-enabled networks such as Ethernet based networks, the method described in the present application allows testing connectivity of Ethernet peers with unknown MAC addresses not only without multicasting the CFM messages, but also without any conversion of the CFM messages, at least at the upstream direction.

As has been acknowledged, the prior art references solve the task of testing peers by various versions of Interworking function placed in an intermediate entity, which process CFM messages in both directions by changing their contents and format. The solution proposed by the Inventors solve the problem in a different and much more effective way.

In the direction from the Source node to a Peer node, the Intermediate Bridge IB of the present invention does not change contents of the message and may only modify its format (but that only if the peer node does not support CFM). IB performs a simple forwarding decision i.e., in case of detecting an alternative address indicator in the multicast CFM message, IB will just forward the CFM message to the alternatively defined destination instead of sending the message to all peers.

Also in the direction from the Peer node to the Source node, the IB does not perform any processing to a response CFM message. Contents of the response CFM message are automatically forwarded by the Ethernet forwarding engine in the IB, as any other Ethernet message. If the response message is not in the CFM format (say, in any OAM format), its contents are just forwarded from the IB to the Source node within a CFM response message.

According to a second aspect of the invention, there is also provided a system for testing peer nodes in a multicast domain, to be performed from an Ethernet network; the system comprises a Source node of the Ethernet network and an Intermediate Bridge connecting the Ethernet network and the multicast domain; said Source node and IB being provided each with additional hardware and/or software means for introducing alternative destination data in CFM messages at the Source node and for detecting, analyzing and utilizing the alternative destination data, comprised in the CFM messages, at the Intermediate Bridge for preventing excessive multicasting in the multi cast domain.

There is also provided a novel software product comprising computerized data and instructions for implementing the above-defined method. The software product can be embedded partially in the IB and in the Source node. The software portions may also reside in the management &configuration system of the combined network.

The present invention also protects a carrier media carrying the mentioned software product.

BRIEF DESCRIPTION OF THE DRAWINGS

The invention will be further explained and illustrated with reference to the following non-limiting drawings in which:

FIG. 5a (prior art) shows an example of a standard TLV structure within a standard CFM message.

FIG. 5b schematically illustrates an example of a structure of proprietary TLV field(s) in a CFM message, comprising information which can be used for determining the destination of the CFM message.

DETAILED DESCRIPTION OF THE PREFERRED EMBODIMENTS

Figure 1:
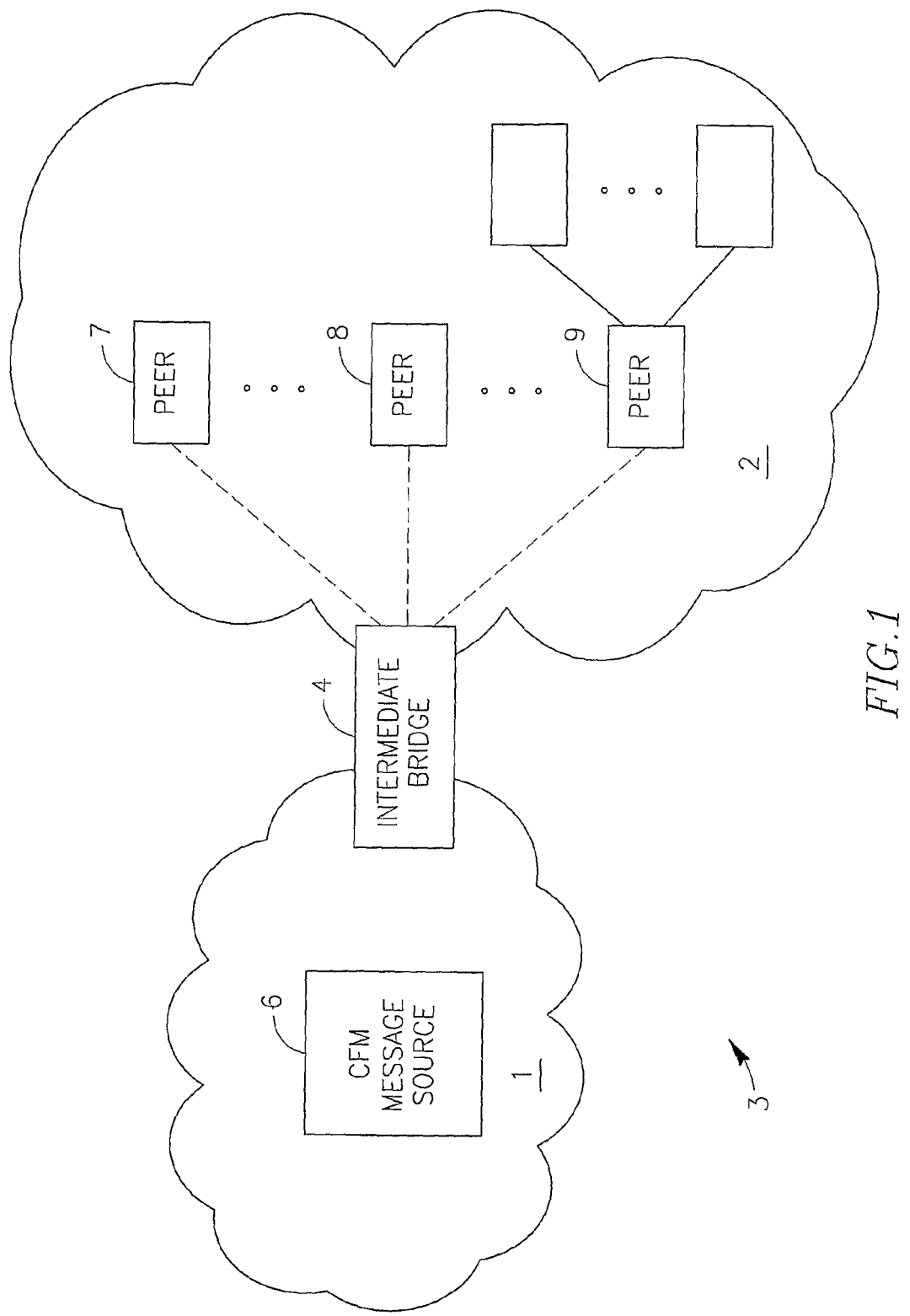
FIG. 1 (prior art) schematically illustrates the type of access networks to which the proposed method can be applied.

FIG. 1 depicts a general configuration of the combined network to which the new proposed method can be applied. An Ethernet-based network 1 and a multicast domain (say, an access network) 2 form a combined network 3. Networks 1 and 2 are interconnected via an Intermediate Bridge (IB) 4. The IB ports (or virtual ports) are connected to peer devices 7, 8, 9 via respective communication lines.

Let node 6 of the Ethernet-based network 1 is a Source of a CFM message, which is sent from the Source to check connectivity/status/performance of a peer device 7 or the link thereof. Let the access network 2 comprises other peer devices 8, . . . 9 which are considered CFM peers of the Source node 6. The peers may be end devices of the network, but may be intermediate nodes (see, for example, device 9). The multicast domain 2 may be Ethernet-based or not. Note that the definition "Peer in a Multicast domain" has been expanded to include also non-Ethernet entities or Ethernet entities that support OAM with non-CFM protocol.

An Ethernet-based network should be understood as either a pure Ethernet network with layer 1 or layer 2 Ethernet or any other network which carries Ethernet packets by other transport mechanisms such as ATM, SDH and Ethernet Pseudowire. In the claims of the present application the word "Ethernet network" is used for the sake of simplicity and should be understood as covering all the meanings of the above-discussed Ethernet-based network.

A multicast domain should be understood as being built from nodes that can be addressed by using a Multicast MAC address. One example of a typical multicast domain is a modern network, such as access network.

Figure 2:
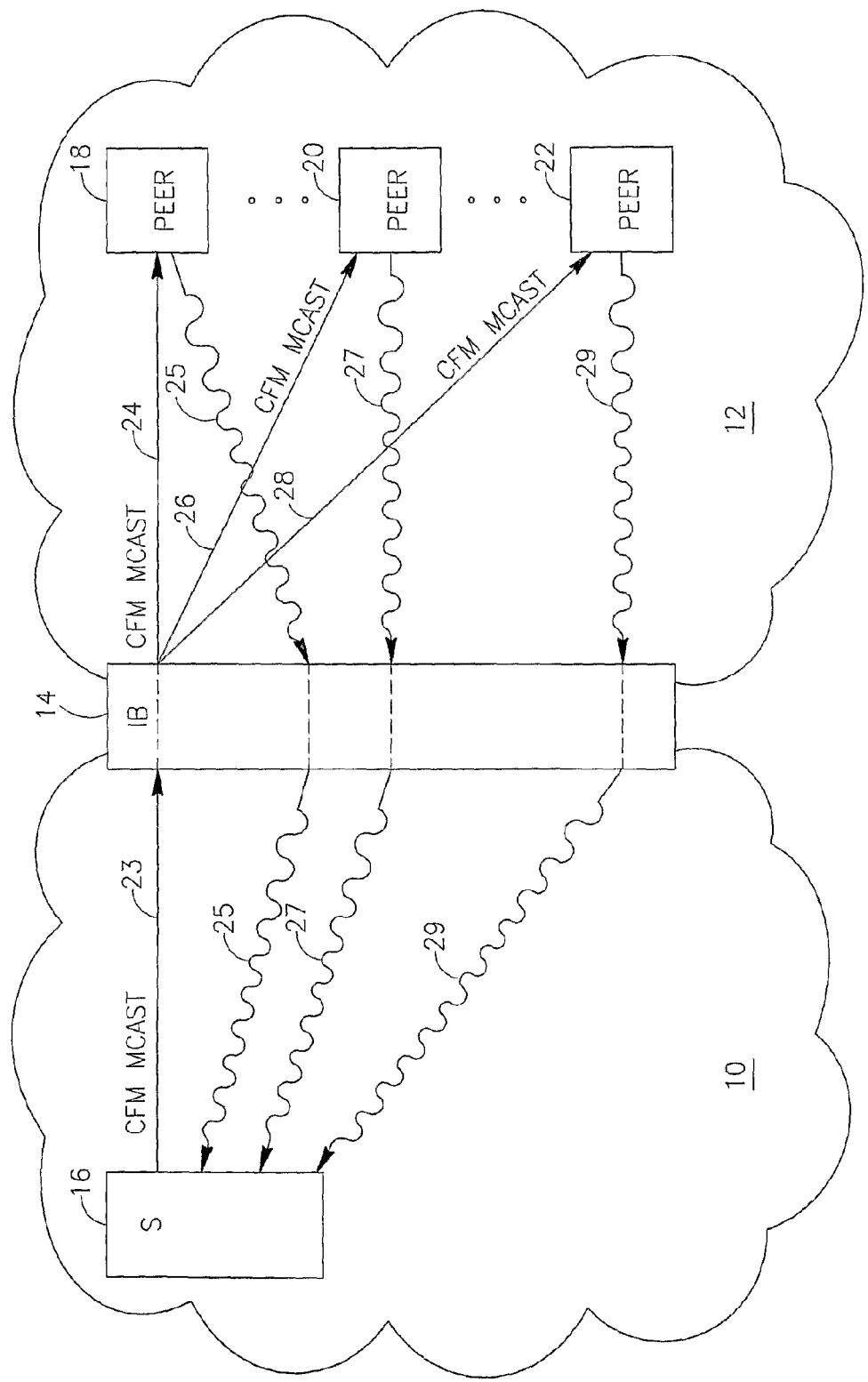
FIG. 2 (prior art) presents a simplified diagram of a widely used standard method for testing connectivity of end nodes in access networks using CFM messages.

FIG. 2 depicts a standard CFM process (according to the IEEE.802.1ag and/or ITU-T Y.1731) of multicasting a CFM message to all peers in a multicast domain in the case that the destination MAC address of the required peer is unknown to the sender of the CFM message.

Figure 3:
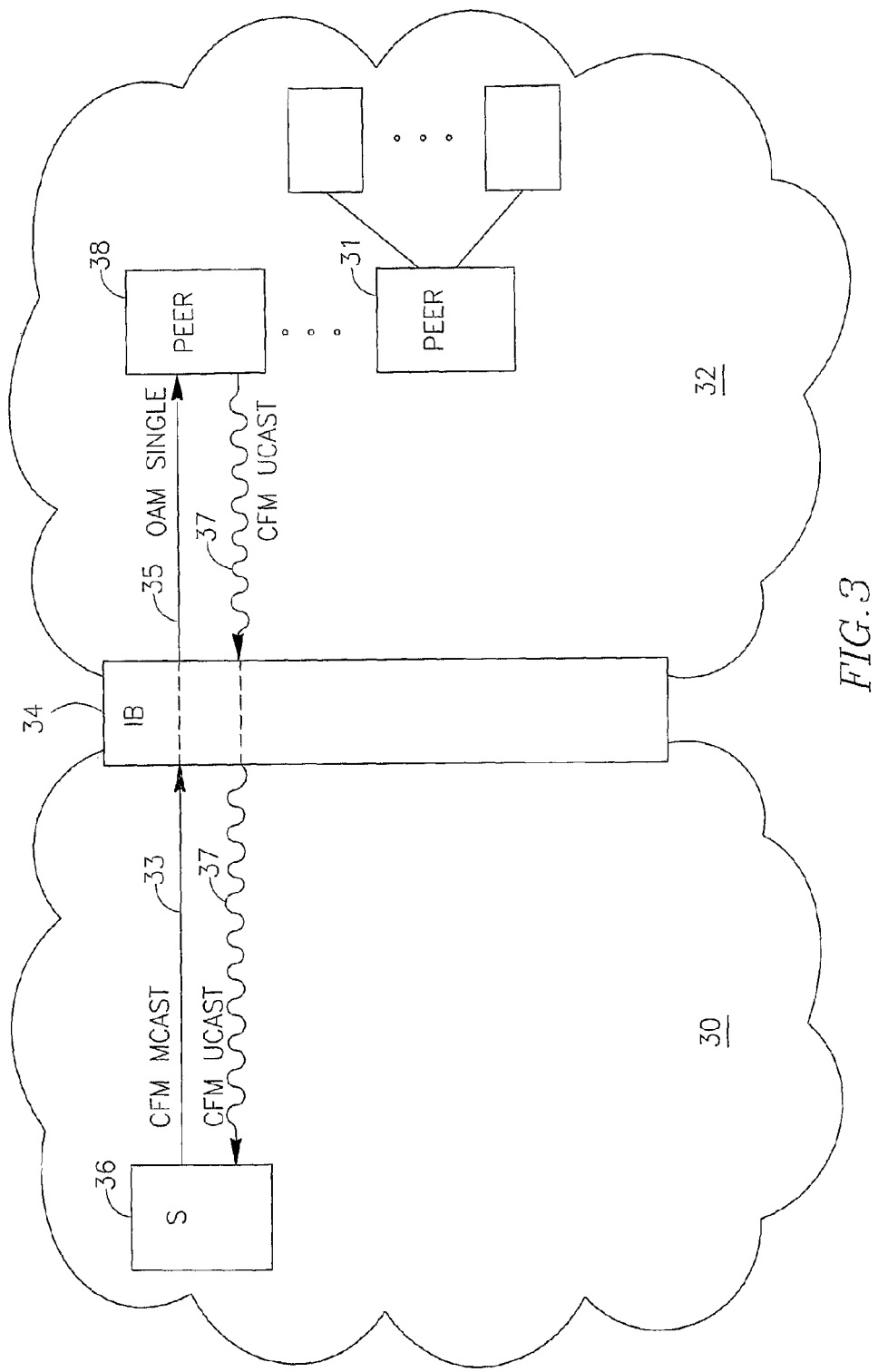
FIG. 3 schematically depicts the method proposed in the present invention, in, case the combined network is CFM capable in all its parts.
Figure 4:
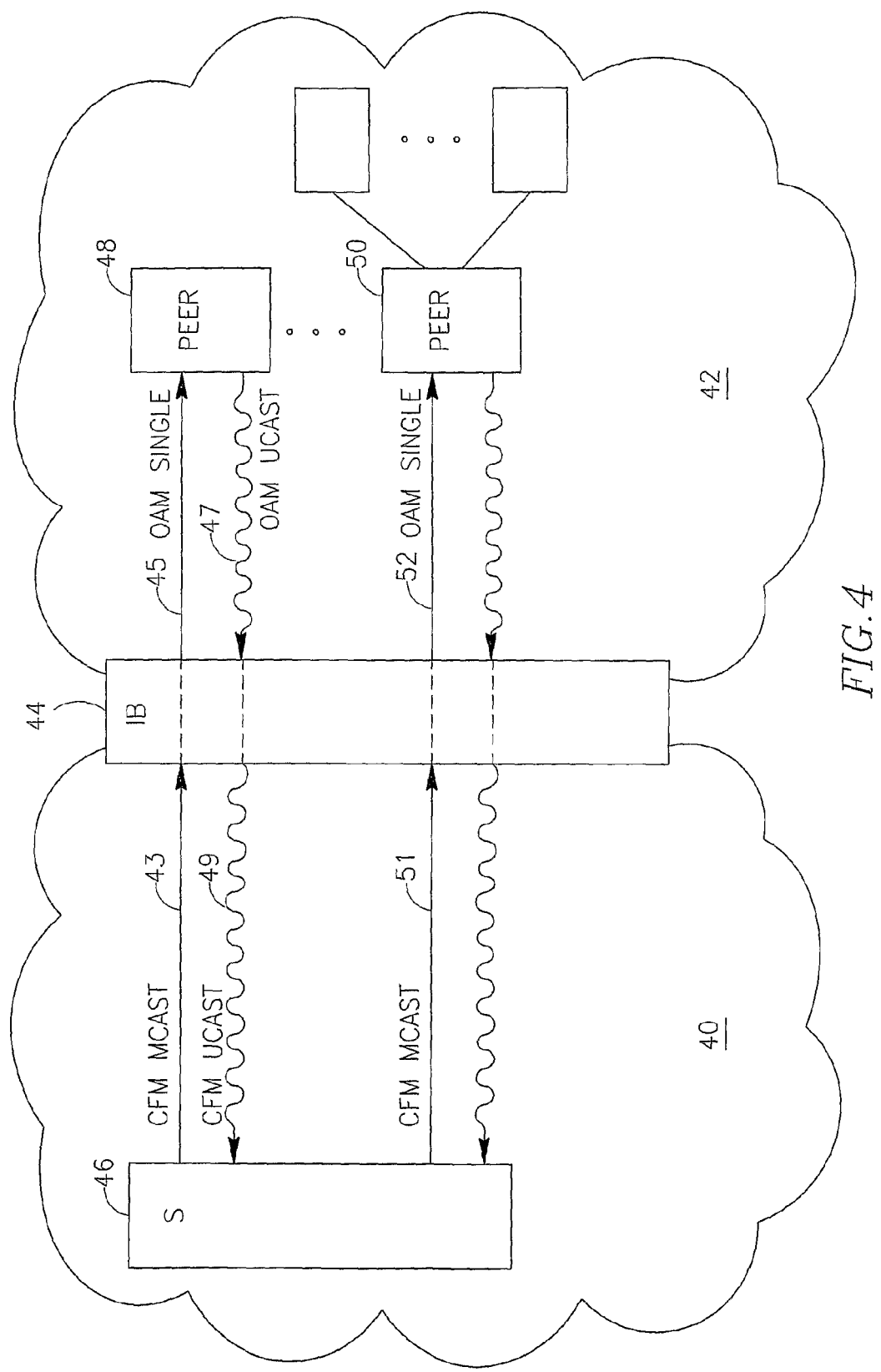
FIG. 4 schematically illustrates an example of performing the proposed inventive method in an access network not supporting CFM messages.

The process is illustrated on the example of a combined network, which comprises an Ethernet-based core network 10 interconnected with an Ethernet-based access network 12 via an Intermediate bridge 14. Let the network 10 comprises a node 16 being a source of a CFM message, and the access network 12 comprises a number of peer devices 18, 20, 22. In case the source node 16 does not know MAC address of the destination to which a CFM message is to be sent, source 16 sends a CFM message 23 to The Intermediate Bridge 14, which is marked as multicast (comprises a multicast MAC). IB receives the message 23, analyzes its contents and forwards it to all its peers, by sending multicast CFM messages 24, 26 and 28 to the respective peers 18, 20, 22. Each of the peers receives the message, analyzes it and responds to the IB 14 with a unicast CFM message. The IB 14 receives multiple though unicast CFM messages 25, 27, 29 and performs the standard bridge forwarding of these messages to the CFM message Source 16. As a result, the Source node 16 receives all the multiple CFM responses 25, 27, 29, analyzes all of them and thus obtains the required information about connectivity/status . . . etc. of the intended destination. In FIGS. 2-4, all response unicast messages are illustrated as waved lines.

FIG. 3 depicts a version of the proposed inventive method of CFM messaging. The method is mainly used in case the specific MAC address of a desired destination peer is unknown to the sender. FIG. 3 illustrates the case when the multicast domain of interest (an access network) supports CFM messages. Similarly to FIG. 2, a combined network comprises a central Ethernet-based network 30 and an access Ethernet-based network 32 interconnected via an Intermediate Bridge 34. Let the Ethernet sender of a CFM message does not know the MAC addresses of some specific destinations but, according to the invention, is able to address them in an alternative manner, by inserting data in at least one proprietary TLV field of the CFM message.

The Source 36 sends a multicast CFM message 33 with a specific alternative description of the destination in one or more proprietary TLV(s). For example, a proprietary TLV comprises indication of a specific output port of the IB, connected to the required destination. Optionally, the alternative destination information can be a user ID, a service ID, a user name or any other attribute that can be mapped to a specific physical or virtual port in the IB. The IB analyzes the CFM message 33, including its proprietary TLV contents, and forwards the contents of the message as a single CFM message 35 via the specific output IB port (if indicated in the TLV) only to the specified destination 38. The destination 38 responds with a standard CFM (unicast) message 37 that then passes to the CFM Message Source 36 through the IB 34 without any specific processing.

It should be noted that IB may send either a unicast or a multicast single message to the peer 31, since the peer 31 has its associated end devices to which the message may be forwarded if required.

FIG. 4 depicts the proposed messaging process for the case when the access network is a non-Ethernet one and does not support CFM messages. In a combined network, an Ethernet—based network 40 is connected to the Multicast domain (access network) 42 via an Intermediate Bridge 44. Let a peer 48 of interest in the domain 42 is not CFM capable, but uses an alternative, "native" protocol for OAM messaging.

In this case, a multicast CFM message 43 from a CFM sender 46 (located in the network 40) is analyzed at the IB 44 and since the MAC address is unknown and cannot be indicated in the multicast CFM message, but there is alternative destination data in one or more proprietary TLV fields, the IB is able to determine the required peer based on that alternative information.

Since, according to the method, the CFM message 43 incorporates at least one proprietary TLV, the IB 44 is preliminarily configured to determine such a field, to determine and classify the data found in the field and to act upon the class of the data. For example, the TLV field comprises an identifier of the peer/a serial number thereof/a name of the user, etc., which enable the IB 44 (possibly, with consulting its internal databases) to identify the particular output port of IB, connected to the destination peer.

The IB thus forms a message for the determined destination, converts it to the native OAM protocol and then forwards it as an OAM single message 45 to the destined peer 48. The peer 48 responds with a native unicast OAM message 47. The IB 44 receives this response message, converts it back to the CFM format and forwards to the sender as a standard unicast CFM message 49.

Since the peer 48 is an end device, the single message 45 sent to the peer 48 from the IB 44 is a simple unicast message. If Source 46 issues another CFM multicast message 51 indicated by its proprietary TLV as "topologically" addressed to peer 50, the IB 44 will send a single message 52 to the peer 50; however, since peer 50 is an intermediate node, the single message 52 can be indicated as either a unicast or a multicast message, depending on further information which may be contained in the proprietary TLV. The similar reservation applies to FIG. 3, in respect of possible CFM messaging between source 36 and peer 31.

FIG. 5*a* (prior art) depicts a standard (IEEE 802.ag) TLV structure in a CFM message, where the TLV describes the port of the sender MEP (Maintenance End point).

FIG. 5*b* illustrates an exemplary structure of the proposed proprietary TLV in a CFM message, for determining the destination of the CFM message based on alternative destination data inserted in the proprietary TLV field. FIG. 5*b* depicts only one example of the possible proprietary TLV, and it has a similar structure to that shown in FIG. 5*a*. However, the structure of proprietary TLVs can be different, and the structure of the alternative destination data may also vary. The IB Port TLV defined in the illustrated TLV indicates a specific physical port in the Intermediate Bridge IB to which the target peer of the OAM message is connected. The IB should output the CFM/OAM message through this port for the message to arrive to the required destination.

In addition to the alternative destination data in the proprietary TLV, the IB may analyze its own internal data base(s) for determining the target peer.

With reference to all the above-described figures, it should be mentioned that the Source node can be implemented as a BRAS (Broadband Remote Access Server), Edge Router, etc.

The Intermediate Bridge can be understood and implemented as a DSLAM (Digital Signal Line Access Multiplexer), Optical Line Termination OLT of a Passive Optical Network PON, Aggregation Node, etc.

The peer node may be a Customer Premises Equipment CPE in DSL systems, Enterprise CPE; computer, host device; home network device, Optical Network Termination unit ONT of PON, etc.

It should be appreciated that other, modified versions of the method, as well as additional embodiments of the system may be further proposed and are to be considered part of the invention as far as being covered by and/or being equivalent to the claims which follow.

The invention claimed is:

1. A method for testing a destination peer node in a multicast domain being interconnected with an Ethernet network via an Intermediate Bridge IB, the method comprising the following steps:
   issuing a multicast Connectivity Fault Management (CFM) message from a Source node located in the Ethernet network, toward the multicast domain, while introducing, into the CFM message, alternative destination data being different than an individual MAC address of the destination peer node;
   said alternative destination data being indicative of a topological position of said destination peer node and being introduced at the Source node, into one or more predetermined fields of the CFM message;
   utilizing said alternative destination data, at the IB, for determining a topological position or address of said destination peer node, by analyzing said one or more predetermined fields of the CFM message, and
   forwarding contents of said CFM message only to said destination peer node.

2. The method according to claim 1, wherein said alternative destination data is introduced in the CFM message when the individual MAC address of the destination peer node is unknown to the Source node.

3. The method according to claim 1, wherein said alternative destination data is introduced in one or more proprietary Type Length Value (TLV) fields of the CFM message.

4. The method according to claim 1, further comprising receiving at the IB a response message from said destination peer node, and forwarding contents of the response message from the IB to the Source node.

5. The method according to claim 1, wherein said alternative destination data is utilized at the IB upon detecting its presence in said CFM message being a multicast message.

6. The method according to claim 4, wherein
   the multicast domain supports CFM,
      both the message issued from the IB to the determined destination peer node, and the response message are CFM messages;
      said CFM message from the Ethernet network is transparently forwarded via the IB to the determined destination peer node,
      said response CFM message is transparently forwarded via the IB to the Source node.

7. The method according to claim 4, wherein the multicast domain does not support CFM, so that both said issued messages from the IB to the determined destination peer node, and the response message, are native OAM format messages, and wherein the method respectively comprises converting said CFM message to an OAM format when forwarding it from the IB to the determined destination peer node, and converting the OAM response message to a CFM format whenever forwarding contents of said response message from the IB to the Source node.

8. A system for testing, from an Ethernet network, peer nodes in a multicast domain; the system comprising:
 a Source node in the Ethernet network, operative to issue a multicast Connectivity Fault Management (CFM) message from the Ethernet network toward the multicast domain, and capable of introducing into one or more predetermined fields of the CFM message alternative destination data being other than an individual MAC address of a destination peer node while being indicative of topological position of said destination peer node;
 an Intermediate Bridge interconnecting the Ethernet network and the multicast domain, operative to receive said CFM message, capable of utilizing said alternative destination data in the CFM by utilizing said one or more predetermined fields of the CFM message, for determining a topological position or address of said destination peer node, and further operative to forward contents of said CFM message only to the determined destination peer node.

9. A system according to claim 8, wherein
 the Source node being capable of introducing said alternative destination data in one or more proprietary TLV fields of the CFM message and sending it as a multicast message to said IB;
 the IB being capable of checking presence of said one or more proprietary TLV fields in the received CFM message;
 if one or more proprietary TLV fields is present in the received CFM message, analyzing said alternative destination data in said one or more predetermined TLV fields;
 determining an intended destination peer node of the CFM message based on at least said alternative destination data;
 issuing a single message to the determined destination peer node in a format supported by said destination peer node, said single message forwarding contents of said CFM message;
 receiving a response message from said destination peer node and forwarding contents of the response message to the Source node.

10. The system according to claim 9, wherein said IB is capable of issuing said single message either in a CFM format or in an CFM format supported by said destination peer node, and capable of converting the response message from said OAM format to the CFM format.

11. A non-transitory computer readable medium having computer readable program code executable by a computer and comprising computer implementable instructions and/or data which, being run on the computer, allow carrying out the method according to claim 1.

* * * * *